(12) United States Patent
Imbimbo et al.

(10) Patent No.: US 8,843,595 B2
(45) Date of Patent: Sep. 23, 2014

(54) METHOD AND DEVICE FOR CONTROLLING COMMUNICATION IN AN INTERNET PROTOCOL MULTIMEDIA SUBSYSTEM IMS

(75) Inventors: Amedeo Imbimbo, Caivano (IT); Salvatore Loreto, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 13/256,598

(22) PCT Filed: Mar. 17, 2009

(86) PCT No.: PCT/EP2009/001950
§ 371 (c)(1),
(2), (4) Date: Nov. 23, 2011

(87) PCT Pub. No.: WO2010/105635
PCT Pub. Date: Sep. 23, 2010

(65) Prior Publication Data
US 2012/0059913 A1   Mar. 8, 2012

(51) Int. Cl.
*G06F 15/16* (2006.01)
*H04L 29/06* (2006.01)
*H04W 36/38* (2009.01)

(52) U.S. Cl.
CPC ......... *H04W 36/385* (2013.01); *H04L 65/1063* (2013.01); *H04L 65/1006* (2013.01); *H04L 65/1069* (2013.01); *H04L 65/1016* (2013.01)
USPC ...................................................... 709/219

(58) Field of Classification Search
CPC .............. H04L 29/08072; H04L 29/06; H04L 29/0809; H04L 29/08117; H04L 29/08657; G06Q 30/02; H04W 4/02
USPC ...................................................... 709/219
See application file for complete search history.

(56) References Cited

U.S. PATENT DOCUMENTS 6,535,493 B1 *   3/2003   Lee et al. ........................ 370/329
7,330,728 B1 *   2/2008   Moll et al. ................. 455/456.3
(Continued)

FOREIGN PATENT DOCUMENTS

WO   2006/118495 A1   11/2006
WO   2008/009197 A1   1/2008
WO   2009/016967 A1   2/2009

OTHER PUBLICATIONS

Agata Brajdic et al., Service Composition in IMS: A Location Based Service Example, Confernece Date: May 7-9, 2008, Publication Date: Jul. 2, 2008, ISWPC, pp. 208-212.*

(Continued)

*Primary Examiner* — Eleni Shiferaw
*Assistant Examiner* — Nelson Giddins
(74) *Attorney, Agent, or Firm* — Coats & Bennett, PLLC (57) ABSTRACT

A control device (104) for controlling communication in an Internet Protocol Multimedia Subsystem IMS (150) coupling a user equipment (160, 162, 164) and an application provider (170, 172, 174) providing an application, the control device (104) comprising a receiving unit (190) adapted for receiving location information indicative of a location of the user equipment (160, 162, 164), a verification unit (192) adapted for verifying if the received location information matches a spatial area and a spatial condition in relation to the spatial area, wherein the spatial area and the spatial condition are part of a control criterion being associated with the application of the application provider (170, 172, 174), and a control unit (194) adapted for controlling a provisioning of the application to the user equipment (160, 162, 164) according to a result of the verification unit (192).

22 Claims, 5 Drawing Sheets

(56) References Cited

U.S. PATENT DOCUMENTS

| | | | |
|---|---|---|---|
| 7,599,988 B2* | 10/2009 | Frank | 709/203 |
| 7,675,858 B2* | 3/2010 | Dekeyzer et al. | 370/236 |
| 7,907,713 B2* | 3/2011 | Khadri | 379/201.01 |
| 7,983,662 B1* | 7/2011 | Ramer et al. | 455/418 |
| 8,055,699 B2* | 11/2011 | Kong et al. | 709/201 |
| 8,155,672 B2* | 4/2012 | Bajpai et al. | 455/456.5 |
| 8,171,014 B2* | 5/2012 | Adler et al. | 707/713 |
| 8,239,368 B2* | 8/2012 | Adler et al. | 707/713 |
| 8,244,802 B2* | 8/2012 | Mitchell | 709/203 |
| 8,255,482 B2* | 8/2012 | McColgan et al. | 709/217 |
| 8,266,302 B2* | 9/2012 | Przybysz et al. | 709/228 |
| 8,301,160 B2* | 10/2012 | Thomson et al. | 455/456.1 |
| 8,320,937 B2* | 11/2012 | Bolin | 455/456.1 |
| 8,341,221 B2* | 12/2012 | Verlare et al. | 709/204 |
| 2002/0035605 A1* | 3/2002 | McDowell et al. | 709/206 |
| 2003/0233461 A1* | 12/2003 | Mariblanca-Nieves et al. | 709/228 |
| 2004/0023670 A1* | 2/2004 | Merheb | 455/456.1 |
| 2004/0083237 A1* | 4/2004 | Burnett | 707/104.1 |
| 2004/0137900 A1* | 7/2004 | Varonen et al. | 455/433 |
| 2005/0055353 A1* | 3/2005 | Marx et al. | 707/10 |
| 2007/0061330 A1* | 3/2007 | Newton et al. | 707/10 |
| 2007/0088836 A1* | 4/2007 | Tai et al. | 709/227 |
| 2007/0124472 A1* | 5/2007 | Requena | 709/225 |
| 2007/0159976 A1* | 7/2007 | Dekeyzer et al. | 370/236 |
| 2007/0162680 A1* | 7/2007 | Mitchell | 711/1 |
| 2007/0249364 A1* | 10/2007 | Bells et al. | 455/456.1 |
| 2008/0082990 A1* | 4/2008 | Kong et al. | 719/318 |
| 2008/0104227 A1* | 5/2008 | Birnie et al. | 709/224 |
| 2008/0313306 A1* | 12/2008 | Skog | 709/218 |
| 2009/0063453 A1* | 3/2009 | Adler et al. | 707/5 |
| 2009/0186596 A1* | 7/2009 | Kaltsukis | 455/404.2 |
| 2009/0271469 A1* | 10/2009 | Benco et al. | 709/201 |
| 2010/0088365 A1* | 4/2010 | Varney | 709/203 |
| 2010/0223326 A1* | 9/2010 | Noldus et al. | 709/203 |
| 2011/0182205 A1* | 7/2011 | Gerdes et al. | 370/254 |
| 2012/0020350 A1* | 1/2012 | Tai et al. | 370/352 |

OTHER PUBLICATIONS

Agata Brajdic et al., Service Composition in IMS: A Location Based Service Example, Conference Date: May 7-9, 2008, Publication Date: Jul. 2, 2008, ISWPC, pp. 208-212.*

Fabini et al., "Terminal-Centric Location Services for the IP Multimedia Subsystem", 2006, IEEE, pp. 881-885.*

3rd Generation Partnership Project. 3GPP TS 23.167, V7.11.0 (Dec. 2008). 3rd Generation Partnership Project; Technical Specification Group Services and Systems Aspects; IP Multimedia Subsystem (IMS) emergency sessions (Release 7), Dec. 2008.

Brajdic, A. et al. "Service Composition in IMS: A Location Based Service Example." 3rd International Symposium on Wireless Pervasive Computing, 2008 (ISWPC 2008), Santorini, Greece, May 7-9, 2008.

3rd Generation Partnership Project, "Technical Specification Group Core Network and Terminals; IP Multimedia (IM) Subsystem Cx and Dx interfaces; Signalling flows and message contents (Release 8)", Jun. 2008, pp. 1-65, 3GPP TS 29.228 V8.2.0.

Peterson, J., "A Presence-based GEOPRIV Location Object Format", Network Working Group, Request for Comments: 4119, Dec. 2005, pp. 1-23, The Internet Society.

Garcia-Martin, M. et al., Private Header (P-Header) Extensions to the Session Initiation Protocol (SIP) for the 3rd-Generation Partnership Project (3GPP), Jan. 2003, pp. 1-34, The Internet Society.

3rd Generation Partnership Project, "Technical Specification Group Services and System Aspects; Universal Geographical Area Description (GAD) (Release 7)", Jun. 2006, pp. 1-29, 3GPP TS 23.032 V7.0.0.

3rd Generation Partnership Project, "Technical Specification Group Core Network; IP Multimedia (IM) session handling; IM call model; Stage 2 (Release 8)", Jun. 2008, pp. 1-63, 3GPP TS 23.218 V8.2.0.

Polk, J., "Location Conveyance for the Session Initiation Protocol", SIP Working Group, Internet Draft, Feb. 24, 2008, pp. 1-42, draft-ietf-sip-location-conveyance-10.txt.

* cited by examiner

METHOD AND DEVICE FOR CONTROLLING COMMUNICATION IN AN INTERNET PROTOCOL MULTIMEDIA SUBSYSTEM IMS

TECHNICAL FIELD

The invention relates to communication, especially to a method and a control device for controlling communication in an Internet Protocol Multimedia Subsystem IMS coupling a user equipment and an application provider providing an application.

BACKGROUND

IP Multimedia Subsystem (IMS) as standardized by $3^{rd}$ Generation Partnership Program (3GPP) Technical Specification (TS) 23.228 V8.7.0 (2008-12) and related 3GPP specifications can be denoted as an architectural framework for delivering internet protocol (IP) multimedia services. By IMS, it is possible to provide "Internet services" over GPRS, Wireless LAN, CDMA2000,fixed line, etc. To ease the integration with the Internet, IMS may use Internet protocols wherever possible, for instance Session Initiation Protocol (SIP). IMS intends to aid the access of multimedia applications from wireless and wired terminals. A user operating an IMS terminal (such as mobile phones, personal digital assistants (PDAs) and computers, also known as IMS user equipment) can register directly on an IMS network.

A user profile associated to an IMS user may be stored on a Home Subscriber Server (HSS) including one or more Filter Criteria (FC) used when determining which Application Server (AS) is invoked for the IMS user.

In the context of this application, the term "user equipment" may particularly denote communication devices to be operated by a user and to be coupled to a communication network. Examples are mobile phones, laptops or personal computers, data cards for plugging or on-board integration into laptops or personal computers, personal digital assistants (PDAs), navigation systems, etc. Hence, mobile (for example portable) or stationary communication devices can be operated in accordance with an IMS architecture. For instance, such a communication device may be used in the context of telecommunications.

The term "application provider" may particularly denote an entity having the capability to provide an assigned application or service to a user equipment. Such an application provider may comprise an application server to be communicatively coupled in a communication network. Examples for an application provider are a Session Initiation Protocol Application Server (SIP-AS), an Internet Protocol Multimedia Service Switching Function (IM-SSF), an Open Services Architecture Service Capability Server (OSA-SCS), or a Service Capability Interaction Manager (SLIM).

The term "application" may particularly denote a specific service, particularly a multimedia or telecommunications service, which can be provided by an application provided to a user equipment.

The term "service point trigger" (SPT) may particularly denote one or more points in an SIP signaling that may cause a control device such as a S-CSCF (Serving Call Session Control Function) to send or proxy the SIP message to an SIP-AS, OSA-SCS, IM-SSF or another application provider. The subset of all possible SPTs which are relevant to a particular application may be defined by means of one or more filter criterion.

The term "filter criterion" may particularly denote information which the S-CSCF receives from the HSS or an AS that may define the relevant SPTs for a particular application. They may define the subset of SIP requests received by the S-CSCF that should be sent or proxied to a particular application. More particularly, an Initial Filter Criterion (iFC) may be denoted as a filter criterion which may be stored in the HSS as part of a user profile and downloaded to the S-CSCF upon user registration. They may represent a provisioned subscription of a user to an application.

Figure 2:
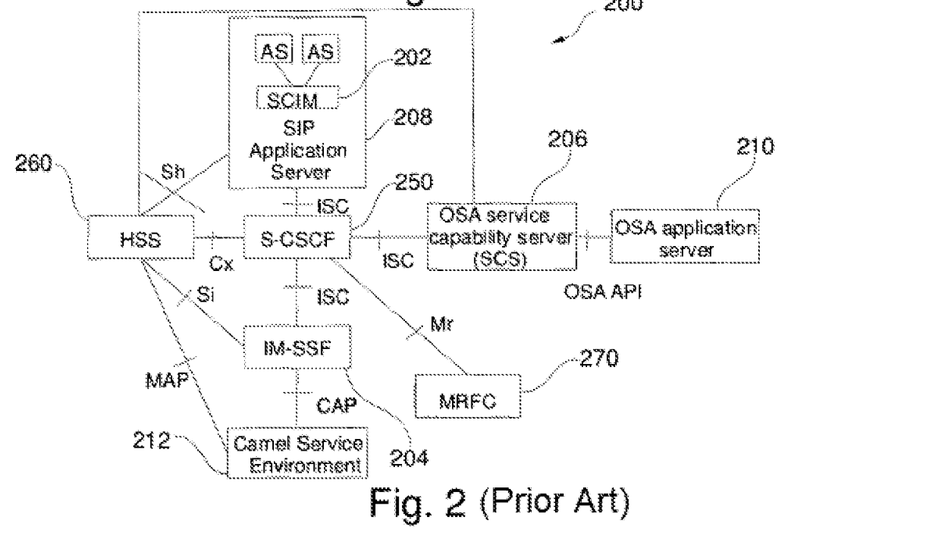
FIG. 2 shows a functional architecture for support of service provision for an IP multimedia subsystem.

FIG. 2 illustrates an architecture 200 for service provision for an IP Multimedia Subsystem. Hence, the functional architecture for support of service provision for an IP multimedia subsystem can be seen in FIG. 2.

FIG. 2 illustrates the architecture with an S-CSCF 250 communicating to HSS 260 via a Cx interface and communicating to various Application Servers via an IP multimedia service control (ISC) interface. The Application Servers can be:

SIP Application Servers 208 which may host and execute services. It may be intended to allow the SIP Application Server 208 to influence and impact the SIP session on behalf of the services;

IM-SSF 204 which is a particular type of application server the purpose of which is to host the Customised Applications for Mobile networks Enhanced Logic (CAMEL) network features (i.e. trigger detection points, CAMEL Service Switching Finite State Machine, etc) and to interface to CAP as specified in 3GPP TS 29.078;

OSA service capability server 206 which interfaces to the OSA framework Application Server 210 and which provides a standardized way for third party secure access to the IM subsystem. The OSA reference architecture defines an OSA Application Server 210 as an entity that provides the service logic execution environment for client applications using the OSA API as specified in 3GPP TS 29.198. This definition of Application Server differs from the definition of Application Server in the context of service provisioning for the IM subsystem, i.e. the entity communicating to the S-CSCF 250 via the ISC interface;

in addition a specialized type of SIP Application Server, the service capability interaction manager (SCIM) 202 which performs the role of interaction management between other application servers.

All the Application Servers, (including the IM-SSF 204 and the OSA-SCS 206) behave as SIP application servers on the ISC interface. In addition the Application Servers can also interact with an MRFC (Media Resource Function) 270 via the S-CSCF 250 (ISC and Mr interfaces) in order to control Multimedia Resource Function processing.

Moreover, a Camel Service Environment unit 212 is shown.

The implementation of Filter Criteria as a basis for a trigger mechanism for triggering specific communication paths or the provisioning of specific services is already possible with the conventional architecture of FIG. 2.

However, conventional IMS architectures may have the shortcoming that it may be difficult or even impossible to ensure that an application is provided to a user equipment with a multimedia content which fits specifically and accurately to user's needs in view of the actual operation conditions of the user equipment.

SUMMARY

It is an object of the invention to enable operation of an IP Multimedia Subsystem to ensure that a user equipment is provided with an application which fits accurately to an operation condition of the user equipment.

In order to achieve the object defined above, a control device, an Internet Protocol Multimedia Subsystem, a communication method, a program element, and a computer-readable medium according to the independent claims are provided.

According to an exemplary embodiment of the invention, a control device for controlling communication in an Internet Protocol Multimedia Subsystem (IMS) coupling a user equipment and an application provider providing an application is provided, wherein the control device comprises a receiving unit adapted for receiving location information indicative of a location of the user equipment, a verification unit adapted for verifying if the received location information matches a spatial area and a spatial condition in relation to the spatial area, wherein the spatial area and the spatial condition are part of (or included in) a control criterion being associated with the application of the application provider, and a control unit adapted for controlling a provisioning of the application to the user equipment according to a result of the verification unit.

According to another exemplary embodiment of the invention, an Internet Protocol Multimedia Subsystem (IMS) is provided which comprises a control device having the above mentioned features.

According to still another exemplary embodiment of the invention, a method for controlling communication in an Internet Protocol Multimedia Subsystem (IMS) coupling a user equipment and an application provider providing an application is provided, wherein the method comprises receiving location information indicative of a location of the user equipment, verifying if the received location information matches a spatial area and a spatial condition in relation to the spatial area, wherein the spatial area and the spatial condition are part of (or included in) a control criterion being associated with the application of the application provider, and controlling a provisioning of the application to the user equipment according to a result of the verification.

According to still another exemplary embodiment of the invention, a program element (for instance a software routine, in source code or in executable code) is provided, which, when being executed by a processor (such as a microprocessor or a central processing unit, CPU, or a part of such a processing entity), is adapted to control or carry out a method having the above mentioned features.

According to yet another exemplary embodiment of the invention, a computer-readable medium (for instance an electronic storage device such as a semiconductor memory, a harddisk, a CD, a DVD, a USB stick, or a floppy disk) is provided, in which a computer program is stored which, when being executed by a processor (such as a microprocessor or a central processing unit, CPU, or a part of such a processing entity), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

According to an exemplary embodiment, a control entity for an IMS network is provided which is capable of controlling access of a user equipment to an application provided by an application provider. For this purpose, it may be possible to apply a control criterion to a present scenario by comparing whether location information indicative of a location of the user equipment fits to a spatial condition of the control criterion. The spatial condition may be in logical correlation with a spatial area included in the control criterion as well so that a decision whether access of a user equipment to an application is enabled or disabled entirely or partially can be taken based on a result of a comparison of the location with the control criterion. By taking this measure, it may be possible to supply a user equipment in a location-specific (and hence content-specific) manner with location-related applications. Therefore, the traffic on the IMS network can be controlled in a highly efficient manner and can therefore be kept small, since services to be supplied to a user equipment may be specifically adjusted to a location of the user.

In the following, further exemplary embodiments of the control device will be explained. However, these embodiments also apply to the Internet Protocol Multimedia Subsystem, to the method, to the program element and to the computer-readable medium.

The receiving unit, the verification unit and/or the control unit may each be physical units such as individual processors or individual portions of a common processor. It is also possible that one or more of these units form logical parts of the control device fulfilling a receiving, verification and control function, respectively.

The receiving unit may have a data input at which information regarding a location or spatial orientation or position of a user equipment may be provided. Such information may be received, for instance, directly or indirectly from the user equipment or from an intermediate node such as a base station in the context of telecommunications network.

The verification unit may take a decision whether the received location information characterizing the position of the user equipment meets the control criterion or not. The result of this decision may be supplied to the communicatively coupled control unit.

The control unit may enable or disable provisioning of the application to the user equipment based on a result of the previous verification. In this context, the control unit may communicate accordingly with a corresponding application server.

In an embodiment, the spatial area may be described in terms of geographical information, particularly in terms of geolocation data. Geographical information may be indicative of a two- or three-dimensional area close to the earth, e.g. on the earth surface, above the earth surface (for instance on a plane), below the earth surface (for instance in a tunnel) or combinations thereof. This geographical information may be formatted as coordinates in a coordinate system or may define a spatial range by a reference to a certain institution, organization or the like (such as a company, a jurisdiction, a country or a public facility).

The spatial condition may specify a spatial relation relative to the spatial area. In other words, there may be a relationship or link between the spatial condition and the spatial area. Such a spatial condition may be for instance whether an entity is within a spatial area, outside of a spatial area, within one of several sub-sections of the spatial area, etc.

The control criterion may be part of a service point trigger (SPT). In the context of IMS, a service point trigger of a filter criterion, particular of an initial filter criterion, may be considered as a data structure including several attributes such as Request URI, SIP method, SIP header, Session Case, Session Description, etc. According to an exemplary embodiment, such a service point trigger may also include an attribute related to the intercorrelated items of spatial condition and spatial area which may be denoted as GeoShape.

More particularly, the service point trigger may be part of a filter criterion, particularly of an IMS filter criterion, such as an initial filter criterion within an IMS context. Such a filter criterion may be considered as a data structure including a trigger point and information regarding a specific application server.

In an embodiment, the verification unit may be adapted for being communicatively coupled with a user data base for receiving the filter criterion from the user data base. Such a user database may include a user profile and may be, in an embodiment, a Home Subscriber Server (HSS). The HSS may be considered as a master user database supporting IMS network entities that may handle tasks such as calls. The HSS may contain subscription-related information (such as the user profiles), may perform authentication and authorization of a user, and can provide information about a user's physical location.

According to an exemplary embodiment, the receiving unit may be adapted for receiving geographical location information as the received location information. Therefore, the location information regarding the spatial position of the user equipment may be transmitted in the form of geographical data. For example, such data may be provided in terms of geographical coordinates, for instance in a Cartesian coordinate system or in a coordinate system using spherical coordinates.

In an embodiment, the IMS network may use Geolocation Data of a user equipment for triggering or managing access to an application. Geolocation may be denoted as the identification of a real-world geographic location of a user equipment such as an Internet-connected computer, a mobile device, etc. Geolocation may include assessing the location, or the actual assessed location, or location-related data of a communicatively coupled entity.

According to an exemplary embodiment, the control device may comprise a first extraction unit adapted for extracting the received location information from a header of a message. It is possible that the first extraction unit forms part of the receiving unit. However, it is alternatively also possible that the first extraction unit is provided as a processing entity which is separate from the receiving unit. Thus, a message may comprise a header and a subsequent message body, wherein the received location information may be included in the header portion. In such an embodiment, the location information may be included in a multiple body message, particularly in a initial part thereof. Such a message may be received by the control device from a communicatively coupled entity such as directly or indirectly from the user equipment or from any other entity knowing a position of the user equipment.

In an embodiment, the control device may comprise a second extraction unit adapted for extracting the location information formatted according to a Presence-based GEOPRIV Location Object Format. RFC 4119 has defined such a Presence-based GEOPRIV Location Object Format, wherein this format may be advantageously used by exemplary embodiments to include the location information of the user equipment and therefore of the user. After having retrieved the location information from a data structure in this format, the one or more control criteria (involving spatial area and spatial condition) may be applied to this location information. It is possible that the second extraction unit forms part of the receiving unit. However, it is alternatively also possible that the second extraction unit is provided as a processing entity which is separate from the receiving unit. The first extraction unit and the second extraction unit may be a common unit or separate units.

In an embodiment, the received location information may comprise a reference to a geographical location. In such a scenario, the geographical location is not directly received by the receiving unit, but only a reference to location information is received which reference may require further interpretation or analysis. In an embodiment, the control device may comprise a communication unit (which may be a separate logic unit or which may be also included as part of the receiving unit) which may be adapted for sending a request to a presence server for converting the reference into geographical information. The communication unit may then receive, from the presence server or from a further entity of the network, a response message which may include the geographical location information indicative of the location of the user equipment. Thus, in such an embodiment, the control device is not provided directly (explicitly) with the location information but only (implicitly) with a reference to this location information. The location information can be accessed by the control device by sending a corresponding request to the presence server and by receiving a corresponding response message in response to the request. By taking this measure, the data transmission safety may be improved since a conversion of the reference into the position data requires to establish a communicative connection with the presence server.

The control unit may be adapted for controlling the provisioning of the application to the user equipment in accordance with one of different control modes, for instance by triggering the provisioning of the application, by triggering a termination of the provisioning of the application, by triggering a pausing of the provisioning of the application and/or by triggering a resuming of the provisioning of the application in dependence of the location of the user information. Therefore, the system may flexibly enable or disable, partly or entirely, permanently or temporarily the provisioning of the application to a specific user equipment. Due to the simple decision logic, it is possible with reasonable computational burden to handle high amounts of data, i.e. to manage multiple user equipments and multiple applications in a flexible manner.

In an embodiment, the control device may comprise a Call Session Control Function (CSCF), particularly a Serving Call Session Control Function (S-CSCF). It may use interfaces to the HSS to download and upload user profiles. It is possible that there is no local storage of user data in the CSCF, so that in this scenario all necessary information may be loaded from the HSS.

In an embodiment, the control criterion may include the condition whether a user equipment is presently located within a boundary of a predefined spatial area. For instance, access to an application may only be granted to a user equipment after having verified that the location of the user equipment is within this spatial area. For example, a message warning a user of a mobile phone to switch off the mobile phone before boarding an aircraft may only be sent to the mobile phone when the mobile phone is located within the territory of an airport.

In another embodiment, access to the application is only provided when a result of the verification unit is that the location of the user equipment is outside of the spatial area. For example, when a person leaves a spatial area such as a jurisdiction this person may be informed about this fact. In another example, when a person leaves a premises of a company, a goodbye message may be sent to the corresponding user equipment.

In still another embodiment, the application provided by the application provider may comprise transmitting multimedia content to the user equipment, which multimedia content may be selected in accordance with the present spatial position of the user equipment. For example, when a user is located within a premises of a company, a company video presentation may be downloaded on the user equipment.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

The illustration in the drawing is schematically. In different drawings, similar or identical elements are provided with the same reference signs.

The explanations of various IMS terms in the section "Background" also apply to exemplary embodiments.

In addition, the term "location information" may particularly denote data indicative of a spatial position of a user equipment. Such location information may include information regarding a present location of a user equipment or may include a former or past location (for instance the location of a user equipment at which the user equipment has been switched on, has been switched off, or transmitted a latest location signal).

The term "spatial area" may particularly denote any spatially defined (for instance delimited) two- or three dimensional region. Such a predefined spatial area may be defined, for example, by a polygon, a circle, a mathematical function, a set of coordinates, a table including data, etc. For example, a spatial area may correspond to a specific public utility such as an airport or a hospital, may correspond to a specific country or jurisdiction such as "Sweden" or "Ohio", or may correspond to a premises of a company.

The term "spatial condition" may particularly denote a condition in logical dependence on a corresponding or assigned spatial area. An example for such a spatial condition with a corresponding consequence would be "if a location of a user equipment is within the spatial area XYZ, then provide the application ABC to this user equipment". Hence, based on whether such a condition is met or not by an actual location of a user equipment, execution of an application may be triggered, execution of an application may be inhibited, or a mode of providing an application may be adjusted accordingly.

The term "control criterion" may particularly denote a criterion (or a plurality of sub-criteria) defining whether full access, limited access or no access of a user equipment to an application is granted. Hence, the control criterion may be in relation to a specific application or application server providing such an application.

In an embodiment, a spatially dependent trigger criterion for triggering a service in an Internet Protocol Multimedia Subsystem is provided which may allow to precisely manage access of a user equipment to a specific service based on an evaluation whether a spatially dependent trigger criterion is met by a spatial location of the user equipment. More particularly, it may be possible to control a service trigger mechanism by allowing to configure IMS with trigger criteria specifying a spatial area within or without which a user equipment may be located. This may allow for an enhanced geographically dedicated IMS application service architecture.

Figure 1:
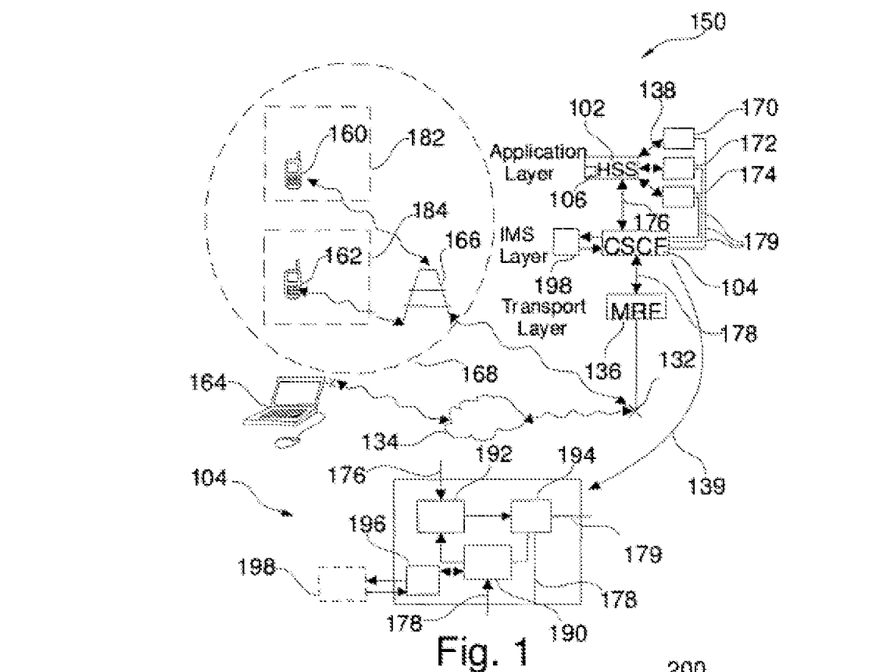
FIG. 1 illustrates an Internet Protocol Multimedia Subsystem including a control device according to an exemplary embodiment of the invention.

As shown in FIG. 1, an IMS communication system 150 according to an exemplary embodiment includes a plurality of user equipment (UE) 160, 162, 164, a Call Session Control Function (CSCF) unit 104, a Home Subscriber Server (HSS) 102 and Application Servers 170, 172, 174. Each UE 160, 162, 164 is a device that contains a Session Initiation Protocol (SIP) User Agent (UA) and is able to initiate or terminate sessions.

The CSCF 104 is responsible for managing the sessions including security and interconnect. Although not differentiated in FIG. 1, there are three types of CSCFs 104. A Proxy (P) CSCF sits at the edge of the network and is the entry point for the UE 160, 162, 164 into the IMS core. The Interrogating (I) CSCF serves as the entry point into the network for peering networks and also acts as the lookup function for finding the appropriate serving node for a subscriber. The Serving (S) CSCF is responsible for authenticating the UE 160, 162, 164 and managing ongoing sessions for the UE 160, 162, 164 including invocation of applications.

The HSS 102 stores relevant user data including authentication information and service data in at least one database. As part of the user profile, initial Filter Criterion (iFC) 106 may be defined to indicate which Application Servers 170, 172, 174 are to be invoked based on information in the signaling plane.

The S-CSCF of the CSCF 104 may communicate with the HSS 102 in order to retrieve UE authentication information. After the user has been authenticated, the S-CSCF of the CSCF 104 may again communicate with the HSS 102 to retrieve the user profile. The user profile may specify services that a user has subscribed to and which Application Server(s) 170, 172, 174 is or are to be invoked for those services.

The Application Servers 170, 172, 174 may be invoked based on the iFCs 106 that are stored in the user profile. The S-CSCF of the CSCF 104 may pass signaling onto an Application Server 170, 172, 174 if the criteria defined in the iFC 106 are met. Once invoked, the Application Server 170, 172, 174 can now take part in the session and provide additional capabilities.

To gain access to the IMS network 150, a UE 160, 162, 164 is required to register which authenticates the user with the network 150, setting up a security association. After a UE 160, 162, 164 has registered, it can then initiate a session.

In the shown embodiment, UE 160 is a first mobile phone which is presently located within a first spatial area 182 representing a territory of an airport. UE 162 is a second mobile phone which is presently located within a second spatial area 184 defining a spatial extension of a hospital. The mobile phones 160, 162 may communicate with a base station 166 which, in turn, may communicate via a communication interface 132 with CSCF 104 via Media Resource Function (MRF) 136. A spatial range 168 over which the base station 166 can communicate with user equipment 160, 162 is shown schematically in FIG. 1 as well. UE 164 is a laptop which communicates for instance via Internet 134 with the communication interface 132.

MRF 136 is connected between the communication interface 132 and the CSCF 104. Communication messages 178 may be exchanged between CSCF 104 and MRF 136. CSCF 104 is further communicatively coupled with the application servers 170, 172, 174 to exchange communication messages 179. Furthermore, communication messages 176 may be exchanged between HSS 102 and CSCF 104. Furthermore, it is possible that communication messages 138 are exchanged between HSS 102 and the application servers 170, 172, 174.

FIG. 1 furthermore shows a detailed illustration of the constitution of the CSCF 104, as indicated by reference numeral 139.

The CSCF 104, inter alia, comprises a receiving unit 190 for receiving location information indicative of a location of one of the UE 160, 162, 164. A verification unit 192 is communicatively coupled with the receiving unit 190 for receiving the location information from the receiving unit 190. In one embodiment, it is possible that the location information is transmitted from the mobile phone 160 to the receiving unit 190, e.g. from a GPS unit of the mobile phone. Alternatively, the location information may be determined by the communication network, e.g. based on tri-angular measurements or by providing cell-ID information to the receiving unit 190.

The location information may be provided explicitly (or directly), e.g. in terms of values representing a geo-location or implicitly (or indirectly) by referencing as explained in more detail in the following.

In an embodiment, receiving unit 190 receives a message comprising location information in a header and passes this message or a part thereof to an extraction unit (which may be part of the receiving unit 190, as in FIG. 1, or which may alternatively be a separate unit) which is adapted to extract the location information from the header. If the location information is explicitly included in the header (for instance the header comprises values representing a spatial area set-up by geographical coordinates), the extraction unit may pass the explicit location information to the verification unit 192. If the location information is included by reference, then the extraction unit may extract the reference and the extraction unit may initiate a reception of explicit location information via communication unit 196.

FIG. 1 shows a presence server 198 communicatively coupled with communication unit 196 of the CSCF 104. In an embodiment in which the CSCF 104 only receives a reference to a geographical location of UE 160, communication unit 196 may send a request to the presence server 198 (or another server containing the location information) for converting the reference into geographical location information such as coordinates. Communication unit 196 may thus use the reference to contact the presence server 198 (or another server containing the location information) to retrieve the geographical location information such as coordinates. For example, presence server 198 may look in a database which geographical location fits to a specific reference. The geographical location information indicative of the present location of UE 160 can then be received by the communication unit 196 from the presence server 198.

Verification unit 192 determines whether the received location information (for instance coordinates of UE 160) matches a spatial area and a spatial condition in relation to the spatial area. More precisely, verification unit 192 determines whether the coordinates of UE 160 are within or without spatial area 182, i.e. at the airport. Data identifying the spatial area 182 and the spatial condition ("inside of spatial area 182?") may be included in an initial filter criterion 106 obtainable via a communication message 176 from the HSS 102. For instance, it may be checked as a corresponding control criterion whether the present location of the UE 160 is in fact within (or outside of) spatial area 182. In the present scenario, the verification unit 192 will take the decision that the control criterion is fulfilled, i.e. that UE 160 is positioned within the spatial area 182, i.e. within the territory of the airport.

A corresponding verification signal may be transmitted from the verification unit 192 to a control unit 194 which then controls provisioning of a specific multimedia application to UE 160 in accordance with the result of this verification, hence in accordance with a content of the verification signal. Since in the present scenario this verification has yielded the result that UE 160 is within airport 182, application server 170 may be triggered to provide a communication message to be sent to UE 160. This communication message may be displayed on a display of UE 160 to warn the user that, since this user is at the airport 182, the mobile phone 160 should be switched off when boarding a plane or at least before takeoff of the plane.

Figure 3:
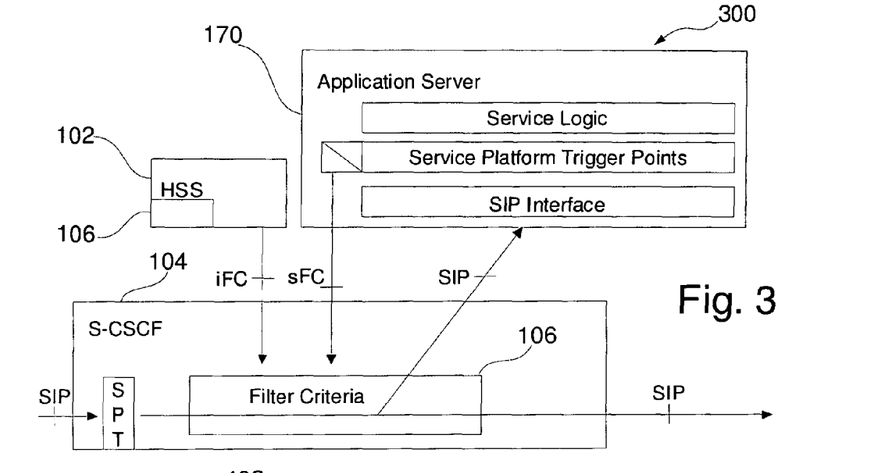
FIG. 3 illustrates an application triggering architecture according to an exemplary embodiment.

FIG. 3 illustrates an application triggering architecture 300.

Next, Service interaction with IP multimedia subsystem will be described.

Service point triggers (SPTs) are those points in the SIP signaling on which filter criterion can be set. The following SPTs are defined:

any initial known or unknown SIP method;

registration type: indicates if the REGISTER request is initial registration, re-registration, or de-registration;

presence or absence of any known or unknown header field;

content of any known or unknown header field or Request-URI;

direction of the request with respect to the served user: either UE-originating or UE-terminating to registered user; UE-terminating to unregistered user or UE-originating for unregistered user; see 3GPP TS 29.228 for the details of the direction information in service point trigger;

session description information.

A filter criterion triggers one or more SPTs in order to send the related request to one specific application server. The set of filter criteria that is stored for a service profile of a specific user may be called "Application Server Subscription Information". In order to allow the S-CSCF 104 to handle the different filter criteria in the right sequence, a priority may be assigned to each of them. If the S-CSCF 104 can not reach the Application Server, the S-CSCF 104 may apply the default handling associated with the trigger. This default handling may be:

to continue verifying if the triggers of lower priority in the list match; or to abandon verification of matching of the triggers of lower priority in the list; and to release the dialogue.

Therefore, a filter criterion may contain the following information:

address of the Application Server to be contacted;

priority of the filter criterion providing the sequence in which the criteria shall be applied;

trigger point composed by 1 to n instances of the service point triggers (SPTs). The SPTs may be linked by means of logical expressions (such as AND, OR, NOT, etc.);

default handling (as described above);

optional service information that shall be added to the message body before it is sent to the Application Server (as an example this may include the IMSI for the IM-SSF).

It is possible that the same priority is not assigned to more than one initial filter criterion for a given end user.

The S-CSCF 104 may request from the HSS 102 a relevant set of iFCs 106 that applies to the end user (i.e., registered, unregistered, or both). If the S-CSCF 104 has a set of iFCs 106 that is deemed valid (for instance from a previous request), the S-CSCF 104 need not request a new set.

In the case that multiple filter criteria 106 are sent from the HSS 102 to the S-CSCF 104, the S-CSCF 104 may check the filter criteria 106 one by one according to their indicated priority when the S-CSCF 104 receives a message via the Mw interface.

On reception of a REGISTER request, the S-CSCF 104 may send a third-party REGISTER request to each Application Server that matches the filter criteria 106 sent from the HSS 102 for the REGISTER request.

On an event that causes network-initiated deregistration, the S-CSCF 104 shall send a third-party REGISTER request to each Application Server that matches the filter criteria 106 sent from the HSS 102 as if a equivalent REGISTER request had been received from the user deregistering that public user identity, or combination of public user identities.

On reception of any other request the S-CSCF 104 may:

1. set up the list of filter criteria 106 for that request according to their priority—it is possible that the sequence of the filter criteria 106 is not changed until the request finally leaves the S-CSCF 104 via the Mw interface again;

2. parse the received request in order to find out the service point triggers (SPTs) that are included in it;

3. check whether the trigger points of the filter criterion 106 with the next highest priority are matched by the SPTs of the request and a) if it does not match, the S-CSCF 104 may immediately proceed with step 4;

b) if it matches, the S-CSCF 104 may:

add an indication to the request which will allow the S-CSCF 104 to identify the message on the incoming side, even if its dialog identification has been changed for instance due to the Application Server performing third party call control;

forward the request via the ISC interface to the Application Server indicated in the current filter criterion 106. The Application Server then performs the service logic, may modify the request and may send the request back to the S-CSCF 104 via the ISC interface;

proceed with step 4 if the request was received again from the Application Server via the ISC interface;

4. repeat the above steps 2 and 3 for every filter criterion 106 which was initially set up (in step 1) until the last filter criterion 106 has been checked;

5. route the request based on normal SIP routing behaviour.

If an Application Server decides to locally terminate a request and sends back a final response for that request via the ISC interface to the S-CSCF 104, the S-CSCF 104 may abandon verification of the matching of the triggers of lower priority in the list. The final response may include the indicator defined in step 3 b) i) above, so that the S-CSCF 104 can correlate the messages.

Each invoked Application Server/service logic may decide not to be engaged with the invoked session by indicating that during the very first SIP transaction when the Record-Route/Route is generated for subsequent SIP requests. The denial may mean that subsequent requests shall not be routed to such Application Servers/service logic any more during the lifetime of that session. Any Application Server, which has determined that it will not receive subsequent requests for a session cannot, in an embodiment, revoke this determination by means of Initial Filter Criterion (iFC) 106.

In the following, referring to FIG. 4, details regarding a user profile 400 will be explained.

Figure 4:
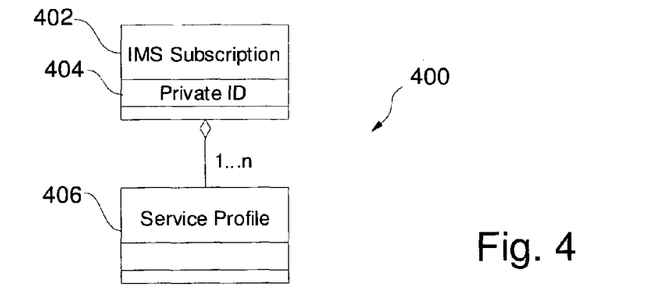
FIG. 4 illustrates a user profile stored in a Home Subscriber Server according to an exemplary embodiment.

FIG. 4 gives an outline of an UML model of the user profile 400, which may be downloaded from HSS 102 to S-CSCF 106. IMS Subscription class 402 contains as a parameter a private user identity 404 of the user in NAI format. Each instance of the IMS Subscription class 402 contains one or several instances of the class service profile 406.

Figure 5:
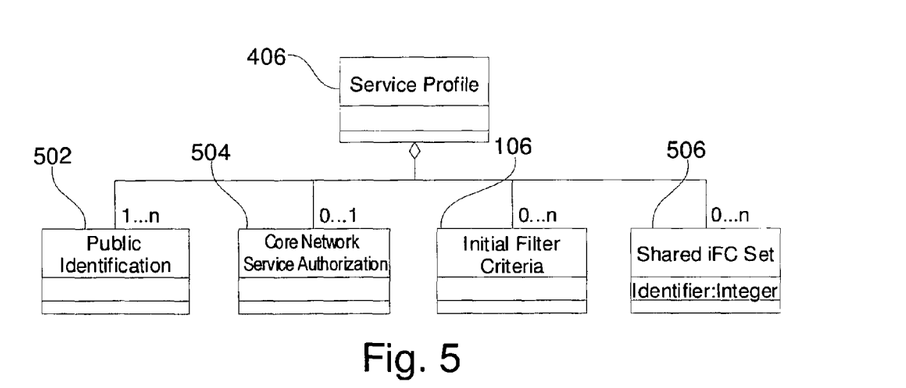
FIG. 5 illustrates a service profile of the user profile of FIG. 4.

FIG. 5 gives an outline of the UML model of the service profile class 406.

Each instance of the service profile class 406 may comprise one or several instances of a class public identification 502. Public identification class 502 contains the public identities associated with that service profile 406. The information in a core network service authorization 504, initial filter criteria 106, and shared iFC set classes 506 may apply to all public identification instances 502 which are included in one service profile class 406.

Each instance of the service profile class 406 contains zero or one instance of the class core network service authorization 504. If no instance of the class core network service authorization 504 is present, no filtering related to subscribed media or restriction on IMS communication service identifiers applies in S-CSCF 104.

Each instance of the class service profile 406 contains zero or several instances of the class initial filter criterion 106.

Each instance of the class service profile 406 contains zero or more instances of the class shared iFC set 506. A shared iFC set may point to a set of initial filter criteria 106 locally administered and stored at the S-CSCF 104. Shared iFC sets 506 may be shared by several service profiles 406.

Figure 6:
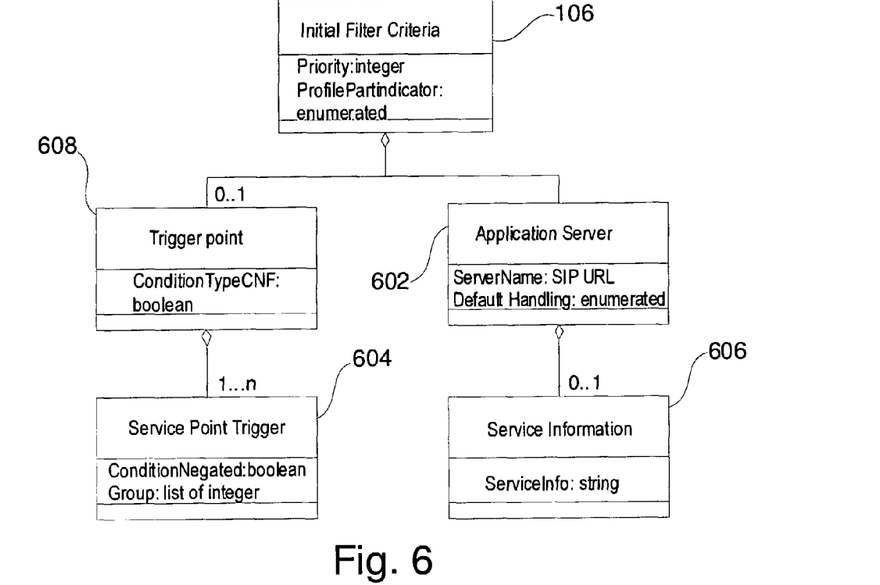
FIG. 6 illustrates an initial filter criterion included in the service profile of FIG. 5.

FIG. 6 gives an outline of the UML model of initial filter criterion class 106.

Each instance of the initial filter criterion class 106 may be composed of zero or one instance of a trigger point class 608 and one instance of an application server class 602. Priority indicates the priority of the filter criterion 106. The higher the priority number the lower the priority of the filter criterion 106 is, i.e. a filter criterion 106 with a higher value of priority number may be assessed after the filter criterion 106 with a smaller priority number have been assessed. It is possible that the same priority is not assigned to more than one initial filter criterion 106.

ProfilePartIndicator attribute is an enumerated type, with possible values REGISTERED and UNREGISTERED, indicating if the iFC 106 is a part of the registered or unregistered user profile. If ProfilePartIndicator is missing from the iFC 106, the iFC 106 is considered to be relevant to both the registered and unregistered parts of the user profile, i.e. belongs to the common part of the user profile.

Trigger point class 608 describes the trigger points that should be checked in order to find out if the indicated application server should be contacted or not. Each trigger point 608 may be a Boolean expression in conjunctive or disjunctive normal form (CNF of DNF). The absence of trigger point instance 608 may indicate an unconditional triggering to application server.

The attribute ConditionTypeCNF attribute may define how the set of SPT5 are expressed, i.e. either an ORed set of ANDed sets of SPT statements or an ANDed set of ORed sets of statements. Individual SPT statements can also be negated. These combinations may be termed, respectively, disjunctive normal form (DNF) and conjunctive normal form (CNF) for the SPT. Both DNF and CNF forms can be used. ConditionTypeCNF may be a Boolean that is TRUE when the trigger point 608 associated with the filter criterion 106 is a Boolean expression in conjunctive normal form (CNF) and FALSE if the trigger point 608 is expressed in disjunctive normal form (DNF).

Each trigger point 608 may be composed by 1 to n instances of the class service point trigger 604.

Application server class 602 may define the application server, which is contacted, if the trigger points 608 are met. Server Name may be the SIP URL of the application server to contact. Default handling determines whether the dialog should be released if the application server could not be reached or not; it may be of type enumerated and can take the values: SESSION_CONTINUED or SESSION_TERMINATED.

Application server class 602 may contain zero or one instance of service information class 606. Service information class 606 allows to download to S-CSCF information that is to be transferred transparently to an application server when the trigger points 608 of a filter criterion 106 are satisfied. Service Information may be a string conveying that information (see 3GPP TS 23.218 for a description of the use of this information element).

Figure 7:
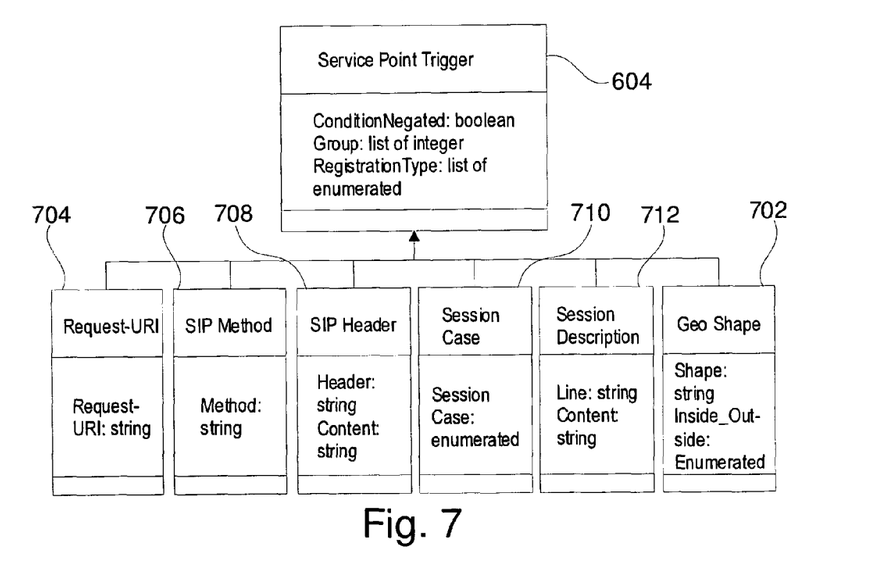
FIG. 7 illustrates a service point trigger forming part of the initial filter criterion of FIG. 6 and including an attribute GeoShape according to an exemplary embodiment.

FIG. 7 gives an outline of the UML model of service point trigger class 604 which has different subsections related to a request URI 704, an SIP method 706, an SIP header 708, a session case 710, a session description 712 and GeoShape field 702 which may include a spatial area correlated to a spatial condition.

The attribute Group of the class service point trigger 604 allows the grouping of SPTs that will configure the sub-expressions inside a CNF or DNF expression. For instance, in the following CNF expression (A+B).(C+D), A+B and C+D would correspond to different groups.

In CNF, the attribute Group identifies the ORed sets of SPT instances. If the SPT belongs to different ORed sets, SPT can have more than one Group values assigned. At least one Group should be assigned for each SPT.

In DNF, the attribute Group identifies the ANDed sets of SPT instances. If the SPT belongs to different ANDed sets, SPT can have more than one Group values assigned. At least one Group should be assigned for each SPI.

The attribute Condition Negated of the class service point trigger 604 defines whether the individual SPT instance is negated (i.e. NOT logical expression).

The attribute Registration Type of the class service point trigger 604 is relevant only to SIP method SPT 706 with a value of "REGISTER" and its support is optional in the HSS 102 and in the S-CSCF 104. The Registration Type may contain a list of values that define whether the SPT matches to REGISTER messages that are related to initial registrations, re-registrations, and/or de-registrations. If Registration Types are given, the SIP Method SPT 706 with a value of "REGISTER" shall match if any of the Registration Types match and the S-CSCF 104 supports the Registration Type attribute. If the SIP Method SPT 706 contains value "REGISTER", and no Registration Type is given, or if the S-CSCF 104 does not support the Registration Type attribute, the SIP Method SPT 706 matches to all REGISTER messages. The attribute Registration Type may be discarded if it is present in an SPT other than SIP Method 706 with value "REGISTER".

Request-URI class 704 may define SPT for the Request-URI. Request-URI contains attribute Request URI.

SIP Method class 706 defines SPT for the SIP method. SIP Method may contain attribute Method which holds the name of any SIP method.

SIP Header class 708 may define SPT for the presence or absence of any SIP header or for the content of any SIP header. SIP Header may contain attribute Header which identifies the SIP Header, which is the SPT, and the Content attribute defines the value of the SIP Header if required.

The absence of the Content attribute and Condition Negated=TRUE may indicate that the SPT is the absence of a determined SIP header.

Session case class 710 represents an enumerated type, with possible values "Originating", "Terminating_Registered", "Terminating_Unregistered", "Originating_Unregistered", "Originating_CDIV" indicating whether the filter should be used by the S-CSCF 104 handling the Originating, Terminating for a registered end user, Terminating for an unregistered end user, Originating for an unregistered end user, or Originating after Call Diversion services.

Session description information class 712 may define SPT for the content of any SDP field within the body of a SIP Method. The Line attribute identifies the line inside the session description. Content is a string defining the content of the line identified by Line.

GeoShape class 702 comprises information about a spatial area described by a string of characters and numbers ("Shape: string") and a spatial condition in relation to the spatial area. The condition may specify if it requires a matching of being "inside" or "outside" and may be stated in form of an enumerated representation. For example, the spatial area may be a string of geo-coordinates (e.g. three or more points on the earth surface represented by latitude and longitude or a point on the earth surface represented by latitude and longitude and a radius etc.) and the condition being explicitly stated by a string sequence of letters "in" or "out" or by codes representing the condition, e.g. "0" for "outside" and "1" for "inside".

Next, a topic related to access location information will be discussed.

RFC 3455 introduces the P-Access-Network-Info header, useful in SIP-based networks that also provide layer 2/layer 3 connectivity through different access technologies. SIP User Agents may use this header to relay information about the access technology to proxies that are providing services. The serving proxy may then use this information to optimize services for the UA. For example, a 3GPP UA may use this header to pass information about the access network such as radio access technology and radio cell identity to its home service provider.

For the purpose of this extension, RFC 3455 defines an access network as the network providing the layer 2/layer 3 IP connectivity which in turn provides a user with access to the SIP capabilities and services provided.

In some cases, the SIP server that provides the user with services may wish to know information about the type of access network that the UA is currently using. Some services are more suitable or less suitable depending on the access type, and some services are of more value to subscribers if the access network details are known by the SIP proxy which provides the user with services.

In other cases, the SIP server that provides the user with services may simply wish to know crude location information in order to provide certain services to the user. For example, location based services available in wireless networks may require the home network to know the identity of the cell the user is being served by.

A GEOPRIV Location Object will be discussed next.

Geographical location information describes a physical position in the world that may correspond to the past, present, or future location of a person, event, or device. Applications for use in the Internet may benefit from sharing location information (including mapping/navigation applications, 'friend finders' on cell phones, and so on). However, such applications may disclose the whereabouts of a person in a manner contrary to the user's preferences. Privacy lapses may result from poor protocol security (which permits eavesdroppers to capture location information), inability to articulate or accommodate user preferences, or similar defects common in existing systems. The privacy concerns surrounding the unwanted disclosure of a person's physical location are among the more serious issues that confront users on the Internet.

Consequently, a need has been identified to convey geographical location information within an object that includes a user's privacy and disclosure preferences and which is protected by strong cryptographic security. Therefore, RFC 4119 extends the XML-based Presence Information Data Format (PIDF) to allow the encapsulation of location information within a presence document.

RFC 4119 does not introduce any format for location information itself. Numerous existing formats based on civic location, geographic coordinates, and the like, have been developed in other standards. Instead, RFC 4119 defines an object that is suitable both for identifying and encapsulating preexisting location information formats, and for providing adequate security and policy controls to regulate the distribution of location information over the Internet.

In the following, some further recognitions of the present inventors regarding conventional IMS will be explained based on which recognitions exemplary embodiments have been developed.

According to conventional IMS standards, it is not possible to trigger service applications on the basis of the current geographical position of a user involved in a session.

It is only possible to configure a service trigger criteria based on the SIP header. One of the possible implementation is a trigger criteria based on the Access Location Information (P-Access-Network-Info header) introduced by RFC 3455 and, with it, it is possible to configure IMS to trigger an application service on the basis of the access network information. In case of mobile user equipments, it is possible to trigger service depending on the basis of WCDMA/GSM cell identifier, i.e. it is possible to trigger a service application each time a session is originated (or terminated) from a predefined cell. It is not possible to define geographical areas, more accurate than the area covered by GSM/UMTS radio accesses.

Another conventional shortcoming is that conventionally it is not possible to configure a service trigger criteria on a SIP Body different from the Session Description Protocol (SDP). However, when a SIP request contains geographic location of a target, the location information is carried including a PIDF-LO (an XML Scheme) as a body part of a SIP request (in that case the body mime type is multipart/mixed and in the body the part containing the location information will be identified by a content type application/pidf+xml, and not application/sdp).

Based on these and other considerations, a gist according to an exemplary embodiment of the invention is to enhance the service trigger mechanism by providing possibility to configure IMS with trigger criteria specifying a geographical area, in terms of any geographical shape, for instance circular area with radius or list of points of a polygon shape, as defined in 3GPP TS 23.032. This provides the possibility to set a condition by freely draw a geographical area, such as an airport area. For instance, all sessions originating or terminated within the specified area may trigger a specified application.

IMS includes a data repository to store a subscriber profile, where the subscriber profile includes service trigger criteria, relating to events that occurs after the session request has been forwarded to a terminating party. IMS includes a mechanism to invoke application service for a service based on the criteria specified in the subscriber profile.

Again referring to FIG. 7, exemplary embodiments may include the SPT Geo Shape 702, which may include:
a spatial area, for instance a description of a geographical area, for instance a polygon (for example by using the WGS84 notation);
a spatial condition in relation to the spatial area, for example an inside/outside indication: inside means that the application shall be triggered when the user is positioned inside the specified geographical shape, outside means that the application shall be triggered when the used is outside.

The newly introduced STP Geo Shape 702 can be part of the filter criterion triggers, stored in the "Application Server Subscription Information", in conjunction or disjunction with other SPRs in order to send the related request to one specific application server.

When an INVITE request containing the Geolocation header is received, S-CFCF 104 may verify the filter criterion 106. The presence of a Geolocation may mean that the location information can be encapsulated (by value or by reference) in the INVITE request according to the XML-based Presence Information Data Format (PIDF), as defined in RFC 4119.

If the location information is encapsulated by value, the S-CSCF 104 may check if the user is located inside the area defined in the trigger criterion 106 (which may be denoted as a spatial service trigger criterion). If the INVITE request encapsulates a geographical shape, S-CSCF 104 may check if this area overlaps the spatial area in the trigger criterion 106.

In the case that the location information is encapsulated by reference, the S-CSCF 104 may de-reference the location generating a SUBSCRIBE request to a presence server (for instance as defined in RFC 3856) using a presence event package. The resulting NOTIFY will contain a PIDF, which should contain a PIDF-LO. Then the S-CSCF 104 may check if the user (more precisely the user equipment) is located inside the area defined in the trigger criterion 106 (spatial service trigger criterion). If the INVITE request encapsulates a geographical shape, S-CSCF 104 may check if this area overlaps the area in the trigger criterion 106.

Figure 8:
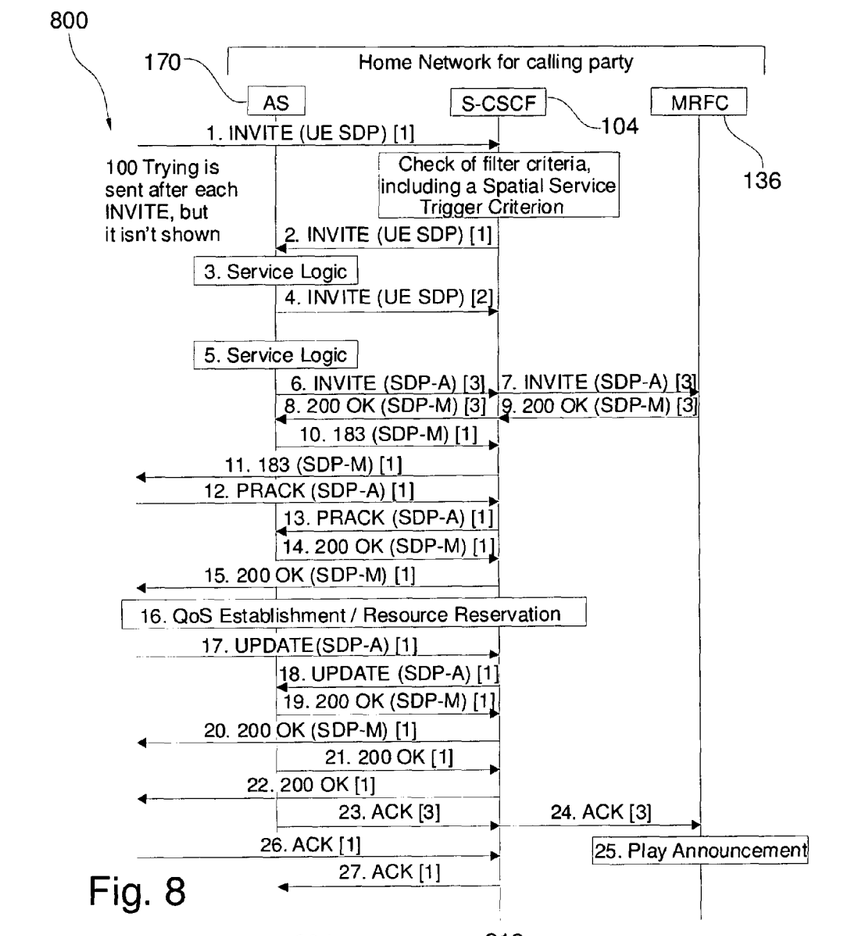
FIG. 8 shows a message flow of a communication between an application server, an S-CSCF and an MRFC within an IMS according to an exemplary embodiment.

FIG. 8 gives an example for an information flow for a UE-originating IP multimedia session that results in playing an announcement. When a message triggering a check of a filter criterion is received at an S-CSCF, e.g. an INVITE message is received from a user equipment, the trigger criteria comprising the GeoShape class 702 criterion are verified. If the message includes geographic information (explicitly or implicitly), then the S-CSCF checks if the received location information matches to the specifications according to the GeoShape class 702. If it matches, a provisioning of an application that is associated with the trigger criteria is executed in a controlled manner. For example, an announcement may be played to the user equipment as an example for an application and explained in more detail below in order to illustrate an example for an implementation of a message and process sequence in an IMS system.

This example relates to an application that may play an announcement to the mobile users every time it requires establishing a session and it is positioned inside a predefined geographical area. The announcement can serve to remind the user in the airport area that the mobile phone must be switched off on the aircraft or to give other flight information. FIG. 8 thus illustrates a tones and announcements call flow 800 based on a spatial service trigger criterion 106.

An application server 170 (which may act as B2BUA) performs third party call control with MRFC 136, where S-CSCF 104 is in the signaling path. The service point trigger 604 contains a GeoShape 702 with the shape describing the geographical area of an airport and the inside, in the present example.

The "[x]" notation in FIG. 8 is an indicator of a unique SIP dialog. The "dot" notation on the application server 170 line indicates B2BUA actions are taking place along with application server 170 service logic. The 100 (Trying) responses are not shown in FIG. 8, but it is assumed that a 100 (Trying) response may be sent in response to each INVITE request.

The B2BUA application server 170 interacts with the UE (not shown in FIG. 8) as usual to establish the dialog. The B2BUA application server 170 interacts with the MRFC 136 using a third party control model to establish the dialog. The B2BUA application server 170 manages the interactions between the two dialogs.

The offer/answer model as defined in IETF RFC 3264 may be used for SDP negotiation between the application server 170, the S-CSCF 104 and the MRFC 136. The MRFC 136 may always grant the requests from the application server 170 (unless there is a resource problem). The MRFC 136 responds to the INVITE request with a 200 (OK) response indicating the selected codec in the SDP. The MRFC 136 may also reserve the requested local resources at that time. The selected codec may be included by the B2BUA application server 170 in the 183 (Session Progress) response to the UE. The receipt of the ACK request at the MRFC 136 triggers the playing of the tone or announcement.

Particularly, the following procedure may be carried out:

1) INVITE request is received at the S-CSCF 104 [Call-ID 1].

2) INVITE request is forwarded to application server 170, based on the filter criterion 106, including a Spatial Service Trigger Criterion.

3) The application server 170 service logic determines to proceed with the call.

4) New INVITE request is sent towards destination, via the S-CSCF 104, to establish a new dialog [Call-ID 2].

5) The application server 170 service logic determines to play an announcement to the calling party.

6) New INVITE request is sent to the MRFC 136, via the S-CSCF 104, to establish a new dialog for playing an announcement [Call-ID 3]. Sufficient information is included to specify the details for the announcement.

7) S-CSCF 104 relays the INVITE request to the MRFC 136.

8) The MRFC 136 allocates the requested resource and returns a 200 (OK) response, with SDP-M indicating selected media.

9) S-CSCF 104 relays 200 (OK) response to the application server 170.

10) - 27) The B2BUA application server 170 manages the dialog for Call-ID 1 as normal, with the SDP-M supplied from the MRFC 136. The MRFC 136 is instructed to play the announcement using the ACK request at flow 26 for Call-ID 3.

Figure 9:
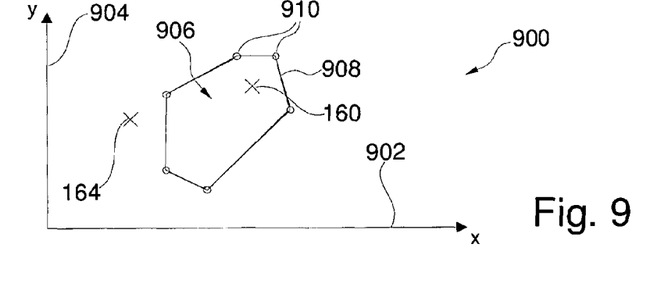
FIG. 9 shows a geometrical representation in a geographical coordinate system correlating a location of user equipment with regard to a predefined spatial area.

FIG. 9 shows a coordinate system 900 having an abscissa 902 (x-axis) and an ordinate 904 (y-axis). In another embodiment, also three-dimensional coordinate systems may be implemented (which may have an additional z-axis).

The coordinate system 900 shown in FIG. 9 includes a spatial area 906 which is delimited by a polygon perimeter 908. Therefore, by the perimeter 908, more particularly by support points 910 thereof, spatial area 906 can be delimited. As can be taken from FIG. 9, a first UE 160 is presently located within spatial area 906 so that a corresponding spatial criteria "is UE within spatial area?" is presently fulfilled. In contrast to this, another UE 164 is presently located apart from spatial area 906 so that a corresponding spatial condition "is UE presently located within spatial area?" is not met for UE 164 in the present scenario. For instance, this decision logic may trigger a procedure that a specific service is provided only to UE 160, not to UE 164.

Figure 10:
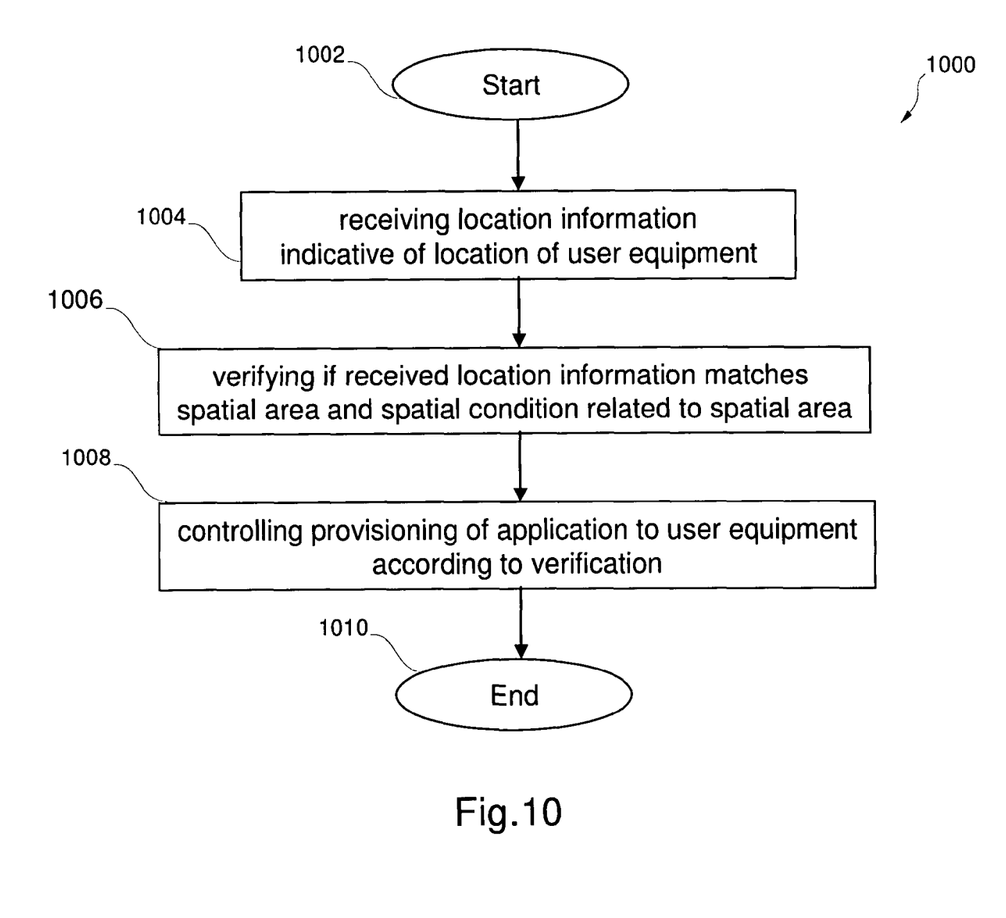
FIG. 10 shows a flow chart illustrating a method for controlling communication in an Internet Protocol Multimedia Subsystem IMS coupling a user equipment and an application provider providing an application according to an exemplary embodiment of the invention.

FIG. 10 shows a flow chart 1000 illustrating a method for controlling communication in an Internet Protocol Multimedia Subsystem IMS coupling a user equipment and an application provider providing an application according to an exemplary embodiment of the invention.

In a block 1002, the method starts.

In a subsequent block 1004, the method continues with receiving location information indicative of a location of the user equipment.

In a subsequent block 1006, the method continues with verifying if the received location information matches a spatial area and a spatial condition in relation to the spatial area, wherein the spatial area and the spatial condition are part of a control criterion being associated with the application of the application provider.

In a block 1008, the method continues with controlling a provisioning of the application to the user equipment according to a result of the verification.

In a block 1010, the method ends.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A control device for controlling communication in an Internet Protocol Multimedia Subsystem, IMS, coupling a user equipment and an application provider that provides an application, the control device comprising:

a receiving circuit configured to receive a reference to geographical information from the user equipment or from an intermediate node by receiving a message that encapsulates by reference said geographical information, wherein the geographical information directly describes a geographical location of the user equipment, and wherein the reference is not geographical information directly describing a geographical location;

a communication circuit configured to:
de-reference said geographical information by sending a request to a presence server requesting that the presence server convert said reference into said geographical information; and
receive said geographical information from the presence server;
a verification circuit configured to verify whether or not a spatial condition is met that depends on said geographical information and its relation to a defined spatial area, wherein the spatial area and the spatial condition are part of a control criterion associated with said application, and
a control circuit configured to control a provisioning of the application to the user equipment according to a result of the verification circuit.

2. The control device according to claim 1, wherein the spatial area is described in terms of geographical information.

3. The control device according to claim 1, wherein the spatial condition specifies a spatial relation relative to the spatial area.

4. The control device according to claim 1, wherein the control criterion is part of a service point trigger.

5. The control device according to claim 4, wherein the service point trigger is part of a filter criterion.

6. The control device according to claim 5, wherein the verification circuit is communicatively coupled with a user data base and is configured to receive the filter criterion from the user data base.

7. The control device according to claim 1, wherein the control device further comprises an extraction circuit configured to extract the reference from a header of a message received by the receiving circuit.

8. The control device according to claim 1, wherein the control device further comprises an extraction circuit configured to extract the reference from a message received by the receiving circuit, based on a format according to a Presence-based Geographic Location/Privilege (GEOPRIV) Location Object Format.

9. The control device according to claim 1, wherein the control circuit is configured to control the provisioning of the application to the user equipment by at least one of:
triggering the provisioning of the application,
triggering a termination of the provisioning of the application,
triggering a pausing of the provisioning of the application, and
triggering a resuming of the provisioning of the application.

10. The control device according to claim 1, wherein the control device comprises a Call Session Control Function node.

11. The control device of claim 1, wherein the reference comprises a piece of data that allows unique retrieval of said geographical information as another piece of data.

12. An Internet Protocol Multimedia Subsystem, IMS, comprising a control device for controlling communication in the IMS, wherein the IMS couples a user equipment and an application provider that provides an application, the control device comprising:
a receiving circuit configured to receive a reference to geographical information from the user equipment or from an intermediate node by receiving a message that encapsulates by reference said geographical information, wherein the geographical information directly describes a geographical location of the user equipment, and wherein the reference is not geographical information directly describing a geographical location;
a communication circuit configured to:
de-reference said geographical information by sending a request to a presence server requesting that the presence server convert said reference into said geographical information; and
receive said geographical information from the presence server;
a verification circuit configured to verify whether or not a spatial condition is met that depends on said geographical information and its relation to a defined spatial area, wherein the spatial area and the spatial condition are part of a control criterion associated with said application, and
a control circuit configured to control a provisioning of the application to the user equipment according to a result of the verification circuit.

13. A method for controlling communication in an Internet Protocol Multimedia Subsystem, IMS, coupling a user equipment and an application provider that provides an application, the method comprising:
receiving a reference to geographical information from the user equipment or from an intermediate node by receiving a message that encapsulates by reference said geographical information, wherein the geographical information directly describes a geographical location of the user equipment, and wherein the reference is not geographical information directly describing a geographical location;
de-referencing said geographical information by sending a request to a presence server requesting that the presence server convert said reference into said geographical information;
receiving said geographical information from the presence server;
verifying whether or not a spatial condition is met that depends on said geographical information and its relation to a defined spatial area, wherein the spatial area and the spatial condition are part of a control criterion associated with said application, and
controlling a provisioning of the application to the user equipment according to a result of the verification.

14. The method according to claim 13, wherein the spatial area is described in terms of geographical information.

15. The method according to claim 13, wherein the spatial condition specifies a spatial relation relative to the spatial area.

16. The method according to claim 13, wherein the control criterion is part of a service point trigger.

17. The method according to claim 16, wherein the service point trigger is part of a filter criterion.

18. The method according to claim 17, wherein said verifying comprises receiving the filter criterion from a user data base.

19. The method according to claim 13, wherein receiving the reference comprises extracting the reference from a header of a received message.

20. The method according to claim 13, wherein receiving the reference comprises extracting the reference from a received message based on a format according to a Presence-based GEOPRIV Location Object Format.

21. The method of claim 13, wherein the reference comprises a piece of data that allows unique retrieval of said geographical information as another piece of data.

22. A computer program product stored on a non-transitory computer-readable medium and comprising computer program instructions that, when executed by a processor associated with a control device, cause the control device to control communication in an Internet Protocol Multimedia Subsystem, IMS, coupling a user equipment and an application provider that provides an application, the computer program instructions causing the control device to:

receive a reference to geographical information from the user equipment or from an intermediate node by receiving a message that encapsulates by reference said geographical information, wherein the geographical information directly describes a geographical location of the user equipment, and wherein the reference is not geographical information directly describing a geographical location;

de-reference said geographical information by sending a request to a presence server requesting that the presence server convert said reference into said geographical information;

receive said geographical information from the presence server;

verify whether or not a spatial condition is met that depends on said geographical information and its relation to a defined spatial area, wherein the spatial area and the spatial condition are part of a control criterion associated with said application, and control a provisioning of the application to the user equipment according to a result of the verification.

* * * * *